US012770149B2

(12) United States Patent
Barshishat et al.

(10) Patent No.: US 12,770,149 B2
(45) Date of Patent: Oct. 20, 2026

(54) SEARCHABLE SECURE TREATMENT FOR CREDIT CARD NUMBERS

(71) Applicant: INTUIT INC., Mountain View, CA (US)

(72) Inventors: Yossi Barshishat, Pardes-Hana (IL); Margarita Vald, Hod Hasharon (IL); Liora Braunstein, Tel Aviv (IL); Yaron Yehuda Karni, Revava (IL)

(73) Assignee: INTUIT INC., Mountain View, CA (US)

( * ) Notice: Subject to any disclaimer, the term of this patent is extended or adjusted under 35 U.S.C. 154(b) by 57 days.

(21) Appl. No.: 18/758,310

(22) Filed: Jun. 28, 2024

(65) Prior Publication Data

US 2026/0004299 A1 Jan. 1, 2026

(51) Int. Cl.
*G06Q 20/40* (2012.01)
*H04L 9/32* (2006.01)

(52) U.S. Cl.
CPC ....... *G06Q 20/4016* (2013.01); *H04L 9/3242* (2013.01)

(58) Field of Classification Search
None
See application file for complete search history.

(56) References Cited

U.S. PATENT DOCUMENTS

| | | | | |
|---|---|---|---|---|
| 7,024,395 B1 * | 4/2006 | McCown | G06Q 40/00 | 705/38 |
| 10,692,078 B1 * | 6/2020 | Kuo | G06Q 20/385 | |
| 2002/0007320 A1 * | 1/2002 | Hogan | G06Q 20/04 | 705/26.1 |
| 2015/0088752 A1 * | 3/2015 | Howe | G06Q 40/00 | 705/51 |
| 2018/0309579 A1 * | 10/2018 | Martin | G06F 21/6245 | |

* cited by examiner

*Primary Examiner* — Divesh Patel
(74) *Attorney, Agent, or Firm* — Patterson + Sheridan, LLP

(57) ABSTRACT

Aspects of the present disclosure relate to creating a secure representation of a credit card number for fraud detection purposes. Embodiments include selecting a first set of digits of a credit card number, wherein the first set of digits comprises one or more digits of a prefix of the credit card number. Embodiments further include selecting a second set of digits of the credit card number. Embodiments further include creating a hash representation of each given digit of the second set of digits based on providing the given digit and the first set of digits as input to a hash function. Embodiments further include creating a secure representation of the credit card number based on the hash representations of each digit of the second set of digits.

14 Claims, 4 Drawing Sheets

SEARCHABLE SECURE TREATMENT FOR CREDIT CARD NUMBERS

INTRODUCTION

Aspects of the present disclosure relate to techniques for securely representing credit card numbers in computing systems for fraud detection purposes. In particular, techniques described herein involve creating an electronic representation of a credit card number that obscures sensitive information associated with the number while allowing fraud detection systems to identify characteristics of the card in order to analyze credit card activity.

BACKGROUND

Every year, millions of people, businesses, and organizations around the world utilize credit cards for engaging in transactions. Because of the widespread use of credit cards for conducting transactions, credit cards are frequently the target of fraudulent activity. For example, fraudsters may steal a credit card number and use the number to purchase goods or otherwise steal money from the cardholder such as by accumulating debt in the cardholder's name.

Existing techniques for preventing fraudulent activity may involve using models (e.g., machine learning models) to recognize patterns and trends that indicate fraudulent activity. For example, a particular spending pattern involving a credit card number may indicate that the card has been compromised by a fraudster who is making small purchases to avoid detection. As another example, a pattern of sequentially close credit card numbers appearing over a relatively short time window may indicate that an issuer's credit card database has been compromised. Machine learning models and other types of fraud detection algorithms may be able to recognize such activity. In order to recognize patterns and trends in credit card activity, these models may require identifying that a same credit card number or a similar credit card number was used in multiple transactions. However, storing credit card numbers for use by such a model can create security risks. For example, fraudsters may be able to obtain the credit card numbers if the database in which the numbers are stored is breached. Due to the security risks associated with storing credit card numbers, the numbers must be processed such that fraudsters are not able to use the numbers in the event of a data breach. However, existing methods of processing information such that the original information cannot be obtained may be incompatible with fraud detection models. For example, if each credit card number is encrypted, a fraud detection system may be unable to determine that two encrypted representations of a number correspond to a same number (e.g., because a different output may be generated by an encryption function in response to the same input). As another example, if credit card numbers are encrypted, a fraud detection system may be unable to determine that two credit card numbers are serial or otherwise sequentially close (e.g., because features of credit card numbers are not necessarily preserved when the credit card numbers are encrypted).

Thus, there is a need in the art for improved techniques for securely storing credit card numbers for fraud detection purposes.

BRIEF SUMMARY

Certain embodiments provide an automated method of creating secure representations of credit card numbers for fraud detection purposes. The method generally includes: selecting a first set of digits of a credit card number, wherein the first set of digits comprises one or more digits of a prefix of the credit card number; selecting a second set of digits of the credit card number; creating a hash representation of each given digit of the second set of digits based on providing the given digit and the first set of digits as input to a hash function; and creating a secure representation of the credit card number based on the hash representations of each given digit of the second set of digits.

Other embodiments provide processing systems configured to perform the aforementioned method as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
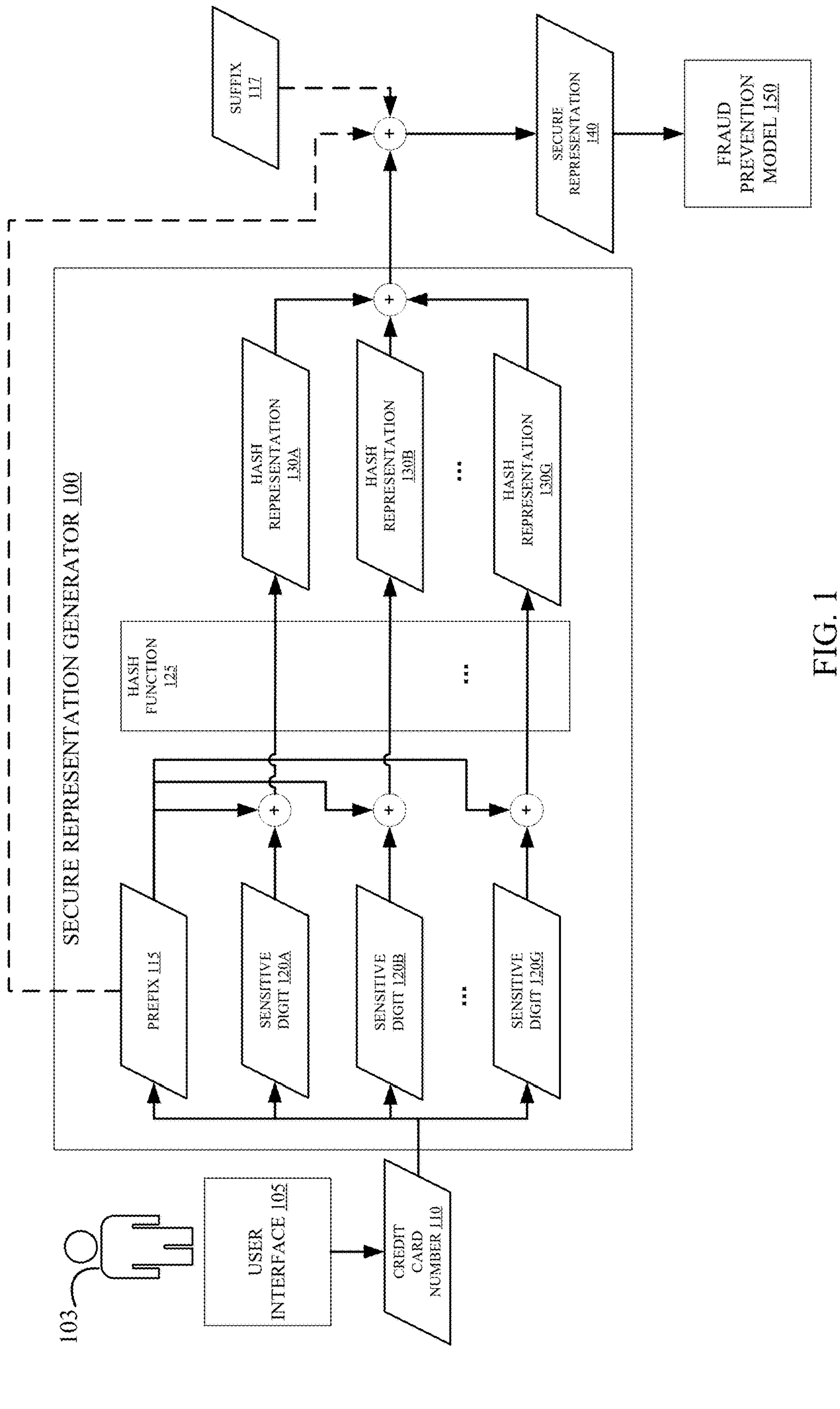
FIG. 1 depicts an example of computing components related to creating a secure representation of a credit card number.

Aspects of the present disclosure provide apparatuses, methods, processing systems, and computer-readable mediums for creating a secure representation of a credit card number for fraud detection purposes.

According to certain embodiments, a secure representation of a credit card number is created based on providing one or more digits of the credit card number to a hash function. A set of digits of the credit card number may be selected for hashing. To create a hashed representation of a digit within the set, the digit may be provided as an input to the hash function along with the prefix of the credit card number, a number that indicates the position of the digit within the credit card number, and/or a secret key (e.g., a set of characters). The hashed representation of this set of digits may be concatenated to another set of digits of the card (e.g., the prefix of the card) in order to create a secure representation of the credit card number. The secure representation may allow for a fraud prevention system to identify that the credit card number was used in two or more transactions, while fraudsters will be unable to re-create the credit card number based on the secure representation, and thus will be unable to defraud the cardholder in the event of a data breach involving the secure representation. Additionally, the secure representation may allow fraud detection systems to perform other forms of analysis involving credit card characteristics, as discussed in further detail below. For example, based on secure representations of credit card numbers, it may be determined that two credit card numbers have a same issuer and are sequentially close to one another (e.g., the cards may share a prefix and the first three digits after the prefix).

In some embodiments, a first set of digits of a credit card may be selected. The first set of digits may comprise one or more digits of the prefix of the credit card number. The digits selected as part of the first set of digits may be digits that identify an issuer of a credit card. The first set of digits may be used to create a hash representation of a second set of digits, as discussed in further detail below. Certain embodiments provide that the first set of digits is included as plain text in the secure representation (e.g., the first set of digits may be concatenated to the hash representation of the second set of digits). Including the first set of digits as plain text in the secure representation may allow for identifying issuers associated with fraudulent activity in connection with fraud detection techniques. For example, if fraudulent activity is detected for one or more credit card numbers having a prefix associated with an issuer, the issuer may be notified that a security breach has occurred involving cards issued by the issuer. In some embodiments, the first set of digits may be encrypted to provide an extra layer of security (e.g., encrypting the first set of digits prevents fraudsters from obtaining the first set of digits in the event of a data breach). In some embodiments, the first set of digits may be excluded from the secure representation (e.g., the first set of digits is not concatenated with the hash representations of the second set of digits).

Certain embodiments provide that a second set of digits of a credit card may be selected. The second set of digits may comprise one or more of the remaining digits of the credit card number. These digits may be sensitive digits of the credit card (e.g., digits that are unique to the cardholder). A hashed representation may be created for each digit of the second set of digits. For example, creating the hashed representation of a digit may comprise providing the digit as input to a hash function, such as a keyed hash function. Hash functions are generally cryptographic algorithms that create a unique output based on an input. The output may be a fixed length of bits (e.g., 256 bits). Keyed hashing may involve providing a secret key value (e.g., a sequence of characters) to a hashing function along with the input (e.g., to prevent brute-force deciphering of a hash). The secret key may be the same across all secure representations. A fraud detection system may be able to recognize that two transactions involve the same credit card number because hash representations are unique to a given input and also identical when identical inputs were used to make the hash representations. However, fraudsters may be unable to decipher the hash representations because hash functions are one-way functions, meaning that the input cannot be re-created from the output except by brute-force guessing.

According to some embodiments, a third set of digits of a credit card may be selected. The third set of digits may include one or more digits of the suffix of the credit card number (e.g., the last digits of the credit card number). The plain text suffix may be concatenated to the end of a hash representation of the second set of digits. In some embodiments, hash representations are not created for digits in the third set of digits. Including the suffix in the secure representation may allow for identifying a user or particular account associated with a fraudulent transaction (e.g., a particular user or particular account may have a credit card number that includes this suffix). In certain embodiments, the suffix is encrypted.

Some embodiments provide that a hash representation of each digit of the second set of digits may be created based on providing the digit and the first set of digits as input to a hash function. For example, the first set of digits may comprise the first six digits of the credit card number. A hash representation of the seventh digit may be created by concatenating the seventh digit to the first set of digits and then providing first set of digits with the seventh digit concatenated at the end to a hash function. The output of the hash function may be used as the hash representation of the seventh digit.

In certain embodiments, the hash representation of each digit of the second set of digits may be created based on providing the digit and a number that indicates the position of the digit within the credit card number as input to a hash function. For example, the hash representation of the seventh digit may be created by providing the seventh digit and the number "7" as input to a hash function. Certain embodiments provide that the digit, the first set of digits, and the number that indicates the position of the digit are all included in the input to the hash function in order to create the hash representation of the digit. When the first set of digits, a number that indicates the position of the digit, and/or a secret key are included in the hash function input, the hash representation generated for the digit may be impractical to decipher by brute-force guessing. For example, fraudsters may attempt to brute-force guess a credit card number from a hash representation by entering random digit combinations until an output of a hash function matches a hash representation. However, larger and more complex inputs (such as inputs that include a secret key) may be extremely difficult to brute-force guess.

According to some embodiments, a subset of a set of characters output by a hash function may be selected as the hash representation of a digit. For example, the output of a hashing function may comprise 256 characters. 128 of these characters may be used as the hash representation. Selecting a smaller subset of the entire output of the hash function may provide a unique representation of an input that requires fewer resources to process and store.

Certain embodiments provide that a secure representation may be created based on the hash representations. For example, the hash representations may be concatenated in an order based on the order of the digits that correspond to the hash representations. For example, the hash representation of the second sensitive digit may be concatenated to the end of the hash representation of the first sensitive digit, the hash representation of the third sensitive digit may be concatenated to the end of the hash representation of the second sensitive digit, and so on. Additionally, in some embodiments the first set of digits (e.g., the prefix) may be concatenated to the hash representations, as discussed above. For example, the first set of digits may be concatenated to the beginning of the secure representation (e.g., before the hash representation of the first sensitive digit). In certain embodiments, the third set of digits (e.g., the suffix) may be concatenated to the hash representations (e.g., at the end of the secure representation, such as after the secure representation of the last sensitive digit).

In some embodiments, the secure representation may be used to detect fraud involving a credit card number. For example, as discussed above, if more than a threshold number of transactions within a time period involve the same credit card number, the same credit card issuer, and/or sequentially close credit card numbers, this may indicate fraud. A fraud detection system may identify two credit card numbers that share a same issuer based on the secure representations of the credit card numbers having a hash representation of a digit that is the same. If the prefix of the credit card numbers is provided to the hash function to generate the hash representations of digits, then two credit card numbers would only have an identical hash representation of a digit if the two card numbers also had the same prefix, and thus the same issuer. Thus, transactions involving credit card numbers from a same issuer may be identified based on analyzing the hash representations of digits of the credit card numbers, and other digits (e.g., the prefix digits) do not need to be stored and/or analyzed in some embodiments.

Furthermore, transactions involving the same credit card number may be identified based on analyzing the hash representations of digits of the credit card numbers, and other digits (e.g., the prefix digits) do not need to be stored or analyzed. For example, a hash representation that is created based on using the prefix as input will create an output that is unique to the prefix, such that a credit card number with a different prefix will not have the same hash representation even if the other digits of the number besides the prefix are identical.

Also, transactions involving serial credit card numbers (or numbers that are otherwise similar or sequentially close to one another) may be identified by comparing one or more of the hash representations. For example, if the hash representation of the first digit of the second set of digits is the same for two transactions, this may indicate that the credit card numbers are serial or otherwise close to one another (e.g., because the numbers share a prefix and the first two digits after the prefix). Serial card numbers or numbers that are sequentially close to one another appearing in a particular time window may indicate that a fraudster has compromised a set of card numbers associated with an issuer and is using the card numbers to engage in fraudulent transactions. For example, if fraudsters breach an issuer's database, the fraudsters may use the credit cards numbers from the database to engage in fraudulent transactions, and thus many credit card numbers associated with the issuer may appear in transactions over a relatively short time window. The credit card numbers may be sequentially close because the numbers were stored sequentially in the issuer's database. As another example, fraudsters may purchase large amounts of credit card numbers from hackers. These purchased numbers are often arranged sequentially and subsequently used by the fraudsters in the same sequential order.

Certain embodiments provide that if two credit card numbers have more than a threshold number of hash representations in common, it may be determined that the credit card numbers are the same, are serial, and/or are sequentially close to one another. As discussed above, patterns of transactions involving the same or similar credit card numbers may be recognized by fraud detection systems (e.g., machine learning-based fraud detection models). The secure representations of credit card numbers disclosed herein allow these fraud detection systems to recognize that two or more transactions involve the same credit card number (or a similar/sequentially close credit card number) without having to store the credit card numbers. Thus, even if a database associated with a fraud detection system is breached, fraudsters will be unable to obtain the credit card numbers.

Embodiments of the present disclosure provide numerous technical and practical effects and benefits. For instance, because the teachings disclosed herein allow for creating a unique representation of a credit card number that cannot be practically deciphered, fraud detection systems may analyze transactions involving credit card numbers without creating security risks by storing the actual credit card numbers. For example, a fraudster that obtains the secure representations through a data breach will be unable to re-create the credit card numbers. Brute-force guessing is generally the only way to decipher a hash function. Concatenating the prefix of a credit card number, a number indicating a position of a digit of the credit card number, and/or a secret key to the digit in order to create a hash representation of the digit can create a hash representation of a credit card number that is not practical to brute-force guess. Also, while existing techniques for creating secure representations of credit card numbers may involve creating hash representations of the credit card numbers (e.g., providing the entire number as input to a hash function), such techniques do not allow for determining whether the credit card numbers are serial or share a same issuer or are otherwise similar. For example, creating a hash representation based on providing the entire number as input would result in a hash representation that would allow a fraud prevention system to determine that two transactions involve the same number (e.g., because the hash representations are the same). However, it would be impossible to derive features such as the prefix or the first few digits after the prefix from such a hash representation, and thus impossible to detect serial or otherwise similar numbers as allowed by the embodiments disclosed herein. Teachings of the present disclosure solve this problem by creating a secure representation of a credit card number that allows for comparing features of the credit card number such as prefixes and digits.

Additionally, embodiments of the present disclosure conserve processing resources compared to other techniques for analyzing transactions based on credit card numbers. For instance, by creating hash representations of credit card number digits based on providing the prefix as input to a hash function, teachings of the present disclosure allow for determining that two transactions involve the same credit card number (or a similar credit card number) without storing the prefix or analyzing the prefix separately from hash representations of the digits. Also, in embodiments where similar credit card numbers are identified, such identification may be made based on creating, storing, and comparing only a few (e.g., one or more) hash representations of credit card number digits. This may result in saving processing resources compared to techniques that involve processing and analyzing a representation of an entire credit card number. Thus, techniques described herein improve automated fraud detection, data privacy, and computing resource utilization.

Example of Computing Components Related to Creating a Secure Representation of a Credit Card Number FIG. 1 depicts an example of computing components related to creating a secure representation of a credit card number.

A user 103 may conduct transactions over a user interface 105, such as an interface associated with a computing device that is used to operate an application. Transaction data that includes a credit card number 110 may be sent to a server associated with the application. The credit card number 110 may be sent to a secure representation generator 100 that is configured to generate a secure representation 140 of the credit card number 110. As discussed above, the secure representation 140 may allow a fraud detection system to determine that multiple transactions involve the same credit card number or a similar (e.g., serial or otherwise sequentially close) credit card number. Identifying such transactions may enable a fraud detection system to detect fraudulent transactions (e.g., transactions involving an issuer whose credit card numbers have been compromised in a data breach). Also, as discussed above, fraudsters will be unable to decipher the credit card number 110 from the secure representation 140 in the event that fraud protection system data is breached.

The prefix 115 of the credit card number 110, which may be a set of the first digits (e.g., the first six digits) of the credit card number 110 may be concatenated with sensitive digit 120A, as discussed in further detail below with respect to FIG. 2. As shown here, sensitive digit 120A is the first digit in the credit card number 110 after the prefix 115. The prefix 115 may be a set of numbers that identifies the issuer of the credit card. The sensitive digits 120A-G may be digits that are unique to the user 103. Although not shown here, in some embodiments a number associated with the position of sensitive digit 120A within the credit card number 110 may also be concatenated to the prefix 115 and sensitive digit 120A. For example, if sensitive digit 120A is the seventh digit in the credit card number, the number seven may be concatenated to the input to the hash function 125. Also, a secret key (e.g., a combination of characters, which may be the same across secure representations) may be concatenated to the input to the hash function 125. In some embodiments, different secret keys may be used for each digit position (e.g., a first secret key may correspond to the ninth digit in each secure representation, and a different secret key may correspond to the tenth digit in each secure representation). The secret key may be the same across different hash representations, or, in embodiments where different secret keys are used for different digits, the combination of secret keys may be the same across different hash representations. The elements of the input to the hash function 125 (e.g., the prefix 115, the sensitive digits 120A-G, a number associated with a position of a sensitive digits, and/or a secret key) may be provided in any order. Characteristics of credit card numbers may be compared if the orders of the input elements are the same across different secure representations. For example, if the hash representation of the seventh digit of a first credit card number is created based on concatenating the elements in a given order and the hash representation of the seventh digit of a second credit card number is created based on concatenating the elements in the same given order, the seventh digit of the first and second credit card numbers may be compared (e.g., if the credit card numbers are identical, the hash representations of their seventh digits will be identical).

The concatenated digits/characters (e.g., the prefix 115 and the sensitive digit 120A), may be provided as input to a hash function 125 to generate hash representation 130A, which is a hash representation of sensitive digit 120A. In some embodiments, a subset of the characters output by hash function 125 are used as the hash representation (e.g., 128 out of 256 characters). The process of creating a hash representation of a digit may be repeated for each of the other sensitive digits 120B-G. The hash function 125 may be a keyed hash function or other types of hashing functions as known in the art (e.g., cryptographic functions that generate a unique output that is identical for identical inputs).

Each of the one or more hash representations 130A-G may be concatenated (e.g., in order based on the order of the sensitive digits 120A-G) to create secure representation 140. Although not shown here, in some embodiments, the secure representation 140 may be created based on concatenating one or more other digits to the hash representations 130A-G. For example, the prefix 115 may be concatenated to the secure representation 140 (e.g., at the front of the secure representation 140). Including the plain-text prefix 115 may allow for determining an issuer that is associated with a credit card number used in a fraudulent transaction (e.g., because the first set of digits identifies the issuer of the credit card). For instance, the issuer may be notified based on a detected fraudulent transaction involving a credit card number issued by the issuer. In some embodiments, the suffix 117 of the credit card number 110 may be concatenated to the secure representation 140 (e.g., at the end of the secure representation 140). Including the suffix 117 in the secure representation 140 may allow for identifying a user or account associated with a fraudulent transaction (e.g., a particular user or particular account may have a credit card number that includes this suffix 117).

Comparing one or more of the hash representations 130A-G in secure representation 140 to one or more hash representations from another secure representation may allow a fraud detection model 150 to determine whether the two transactions involve similar (e.g., serial or otherwise sequentially close, such as having digits within a threshold distance of one another) credit card numbers. For example, it may be determined that two numbers are similar based on a threshold number of hash representations being the same (e.g., the same representation(s) appear in the same order). Comparing all of the hash representations 130A-G in secure representation 140 to all of the hash representations of another secure representation may allow the fraud detection model 150 to determine whether two transactions involve identical credit card numbers. In some embodiments, the fraud detection model 150 is a machine learning model that is trained to recognize fraudulent transactions based on trends in activity involving secure representations (e.g., a same credit card number or multiple similar credit card numbers appearing in multiple transactions over a relatively short period of time). Based on a detected fraudulent transaction, one or more actions (such as automated actions) may be taken, such as blocking the transaction, flagging the transaction for further review, notifying users and issuers whose credit card numbers may be associated with the fraudulent transaction, and/or the like.

Figure 2:
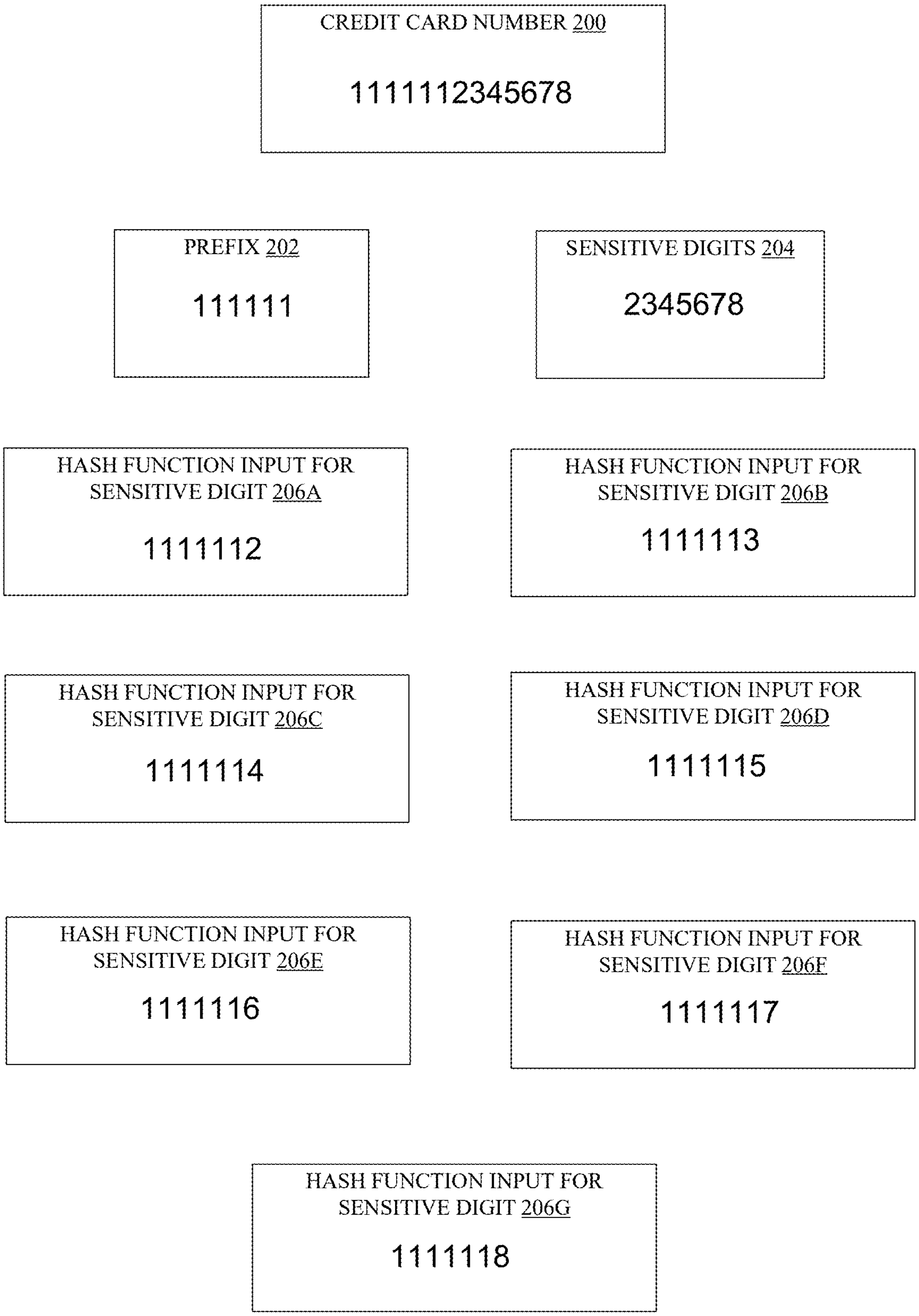
FIG. 2 depicts an example of a credit card number and the inputs to a hash function for creating a secure representation of the credit card number.

Example of Computing Components Related to Creating a Secure Representation of a Credit Card Number FIG. 2 depicts an example of a credit card number 200 and the inputs 206A-G to a hash function for creating a secure representation of the credit card number.

The credit card number 200 shown here is a thirteen digit credit card number. The first six digits of the example credit card number 200, "111111," may be the prefix 202 of the credit card number 200. The prefix 202 may be used to identify the issuer of the credit card. A six digit prefix is included as an example, and prefixes of other digit lengths are possible.

The remaining seven digits of the example credit card number 200, "2345678," may be the sensitive digits 204 of the credit card number 200. The sensitive digits 204 may be the digits that are unique to the cardholder.

As discussed above, hash representations for each of the sensitive digits 204 may be created by concatenating the sensitive digit to the prefix 112 (e.g., at the front of the prefix 202 or at the end of the prefix 202, as shown here). By concatenating the first sensitive digit, "2," to the prefix 202, hash function input for sensitive digit 206A is created. The process may be repeated with the second sensitive digit, "3," to create hash function input for sensitive digit 206B, and so on. Hash function input for sensitive digit 206A may be provided to a hash function to create a hash representation of the first sensitive digit, hash function input for sensitive digit 206B may be provided to a hash function to create a hash representation of the second sensitive digit, and so on.

As shown in this example, the hash function inputs 206A-G show the respective sensitive digit concatenated at the end of the prefix 202. As discussed in detail above, other orders and combinations of inputs are possible. For example, the respective sensitive digit may be concatenated at the beginning of the prefix 202. Other inputs, such as a secret key and/or a number that is selected based on the position of the sensitive digit (e.g., seven for the seventh digit of the credit card number) may also be included in the input. As discussed above, when the order and combination of inputs is consistent across secure representations, the representations may be compared. For example, if secure representations of two credit card numbers are both created based on concatenating the first sensitive digit to the end of a prefix, the numbers may be compared (e.g., identical numbers will have identical hash representations). However, if one secure representation is created based on concatenating the first sensitive digit to the end of a prefix and the other secure representation is created based on concatenating the first sensitive digit to the beginning of a prefix, comparison may not be possible (e.g., identical credit card numbers will have different secure representations).

Figure 3:
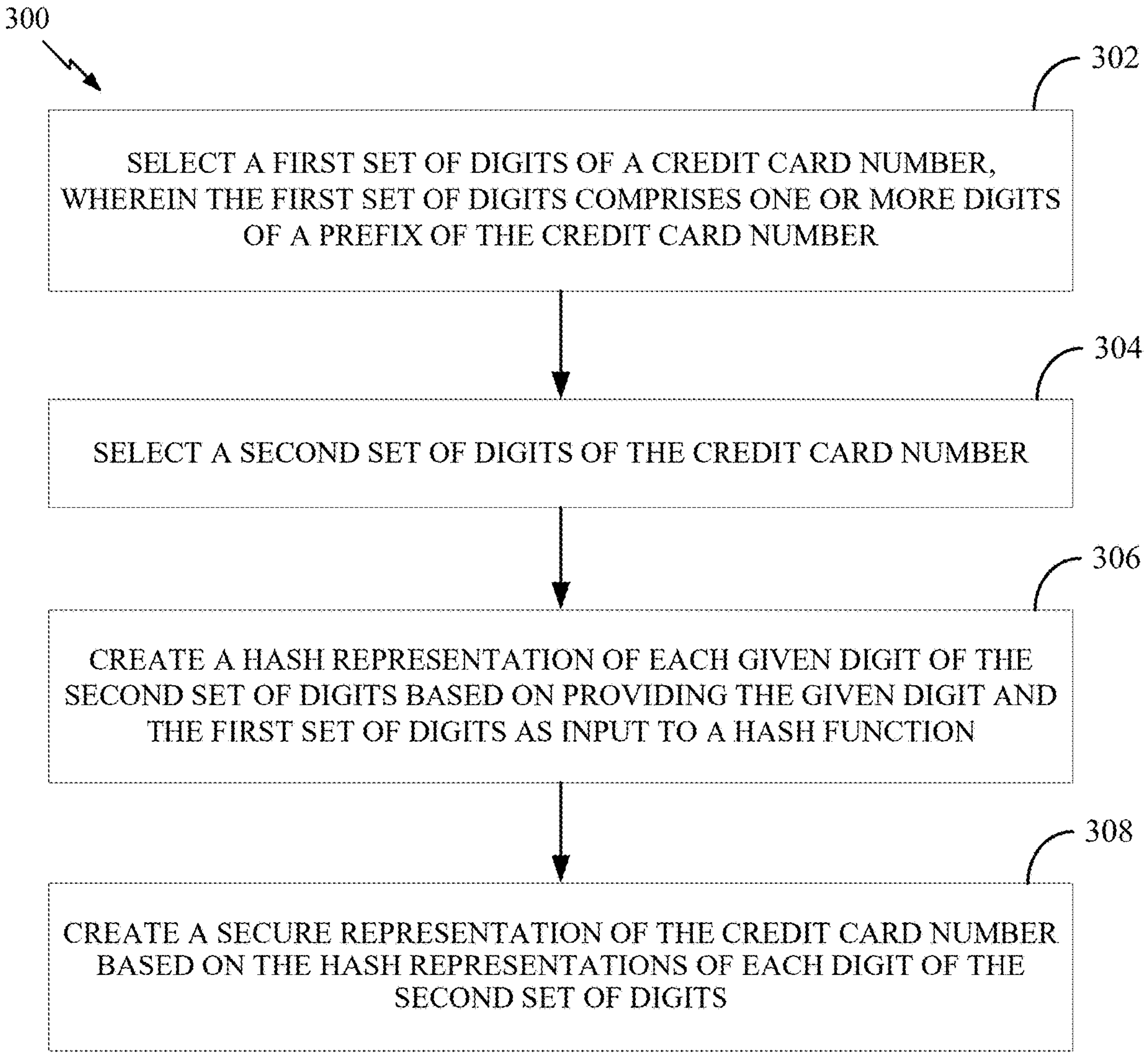
FIG. 3 depicts example operations related to creating a secure representation of a credit card number.

Example Operations Related to Creating a Secure Representation of a Credit Card Number FIG. 3 depicts example operations 300 related to creating a secure representation of a credit card number. For example, operations 300 may be performed by one or more of the components described with respect to FIG. 1.

Operations 300 begin at step 302 with selecting a first set of digits of a credit card number, wherein the first set of digits comprises one or more digits of a prefix of the credit card number.

Operations 300 continue at step 304 with selecting a second set of digits of the credit card number.

Operations 300 continue at step 306 with creating a hash representation of each given digit of the second set of digits based on providing the given digit and the first set of digits as input to a hash function. According to some embodiments, creating hash representations of each given digit of the second set of digits further comprises providing a number that is selected based on a position of the given digit as input to a hash function. In certain embodiments, creating hash representations of each given digit of the second set of digits comprises selecting a subset of a set of characters generated by a hash function in response to receiving the given digit and the first set of digits as input, wherein the subset is used as the hash representation for the given digit. Some embodiments provide that the hash representations are created using a keyed hash function (e.g., a hash function that involves using a secret key as part of the input).

Operations 300 continue at step 308 with creating a secure representation of the credit card number based on the hash representations of each given digit of the second set of digits. Certain embodiments provide that secure representations of multiple credit card numbers are created and used by a fraud detection system to detect fraudulent activity. According to some embodiments, the fraud detection system is configured to recognize that a first transaction and a second transaction involve a same credit card number based on comparing secure representations of credit card numbers. In certain embodiments, the fraud detection system is configured to recognize fraud based on confirming that more than a threshold number of hash representations are identical between two credit card numbers. Some embodiments provide that creating the secure representation of the credit card number comprises concatenating the hash representations of each given digit of the second set of digits based on an order associated with the second set of digits. In certain embodiments, creating the secure representation of the credit card number further comprises concatenating the hash representations of each given digit of the second set of digits to the first set of digits.

Figure 4:
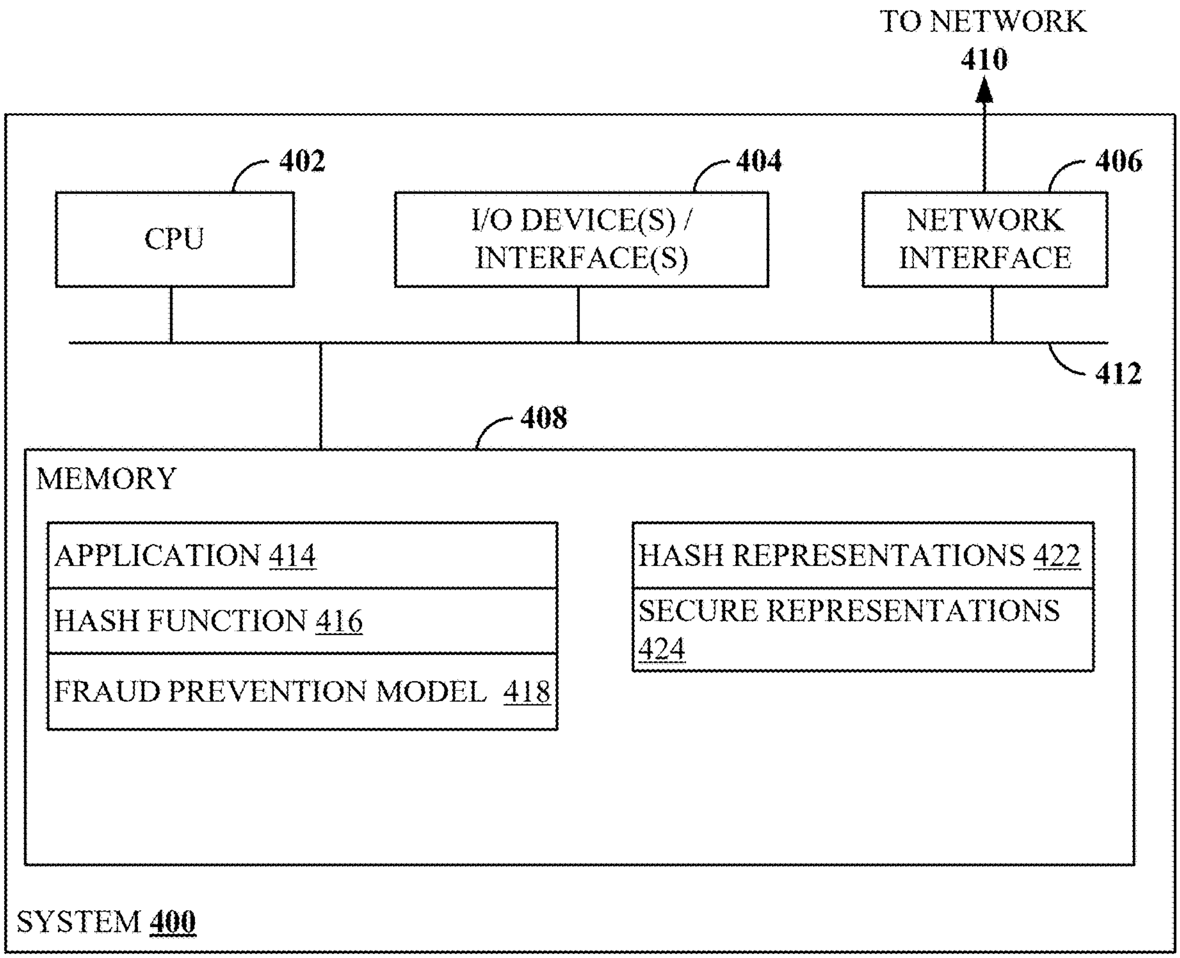
FIG. 4 depicts an example of a processing system for creating a secure representation of a credit card number.

Example of a Processing System for Creating a Secure Representation of a Credit Card Number FIG. 4 illustrates an example system 400 with which embodiments of the present disclosure may be implemented. For example, system 400 may be configured to perform operations 300 of FIG. 3 and/or to implement one or more components as in FIG. 1.

System 400 includes a central processing unit (CPU) 402, one or more I/O device interfaces that may allow for the connection of various I/O devices 404 (e.g., keyboards, displays, mouse devices, pen input, etc.) to the system 400, network interface 406, a memory 408, and an interconnect 412. It is contemplated that one or more components of system 400 may be located remotely and accessed via a network 410. It is further contemplated that one or more components of system 400 may comprise physical components or virtualized components.

CPU 402 may retrieve and execute programming instructions stored in the memory 408. Similarly, the CPU 402 may retrieve and store application data residing in the memory 408. The interconnect 412 transmits programming instructions and application data, among the CPU 402, I/O device interface 404, network interface 406, and memory 408. CPU 402 is included to be representative of a single CPU, multiple CPUs, a single CPU having multiple processing cores, and other arrangements.

Additionally, the memory 408 is included to be representative of a random access memory or the like. In some embodiments, memory 408 may comprise a disk drive, solid state drive, or a collection of storage devices distributed across multiple storage systems. Although shown as a single unit, the memory 408 may be a combination of fixed and/or removable storage devices, such as fixed disc drives, removable memory cards or optical storage, network attached storage (NAS), or a storage area-network (SAN).

As shown, memory 408 includes application 414, hash function 416, and fraud detection model 418. In some embodiments, application 414 may be representative of a software application associated with a user's computing device, and may perform various aspects of functionality described herein. Hash function 416 may be representative of hash function 125 of FIG. 1. Fraud prevention model 418 may be fraud prevention model 150 of FIG. 1.

Memory 408 further comprises hash representations 422 which may correspond to hash representations 130A-G of FIG. 1. Memory 408 further comprises secure representations 424, which may correspond to secure representation 140 of FIG. 1. It is noted that in some embodiments, system 400 may interact with one or more external components, such as via network 410, in order to retrieve data and/or perform operations.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method, comprising:

receiving a set of electronic transactions at a server, each electronic transaction of the set of electronic transactions comprising a respective credit card number;

for each respective credit card number:

selecting a first set of digits of the respective credit card number, wherein the first set of digits comprises one or more digits of a prefix of the respective credit card number;

selecting a second set of digits of the respective credit card number, wherein the second set of digits comprises digits that are unique to a cardholder;

creating a hash representation of each given digit of the second set of digits based on providing the given digit and the first set of digits as input to a hash function; and creating a respective secure representation of the respective credit card number based on the hash representations of each digit of the second set of digits; and based on more than a given threshold amount of transactions of the set of transactions having secure representations with more than a particular threshold number of matching hash representations, either:

blocking one or more transactions of the set of transactions via the server; or flagging at least one transaction of the set of transactions for review via the server.

2. The method of claim 1, wherein creating hash representations of each given digit of the second set of digits further comprises providing a number that is selected based on a position of the given digit as input to a hash function.

3. The method of claim 1, wherein creating hash representations of each given digit of the second set of digits comprises selecting a subset of a set of characters generated by a hash function in response to receiving the given digit and the first set of digits as input, wherein the subset is used as the hash representation for the given digit.

4. The method of claim 1, wherein creating the secure representation of the credit card number comprises concatenating the hash representations of each given digit of the second set of digits based on an order associated with the second set of digits.

5. The method of claim 4, wherein creating the secure representation of the credit card number further comprises concatenating the hash representations of each given digit of the second set of digits to the first set of digits.

6. The method of claim 4, wherein creating the secure representation of the credit card number further comprises concatenating a third set of digits to the secure representation, wherein the third set of digits comprises one or more digits of a suffix of the credit card number.

7. The method of claim 1, wherein the hash representations are created using a keyed hash function.

8. A system for creating a secure representation of a credit card number for fraud detection purposes, comprising:

one or more processors; and a memory comprising instructions that, when executed by the one or more processors, cause the system to:

receive a set of electronic transactions, each electronic transaction of the set of electronic transactions comprising a respective credit card number;

for each respective credit card number:

select a first set of digits of the respective credit card number, wherein the first set of digits comprises one or more digits of a prefix of the respective credit card number;

select a second set of digits of the respective credit card number, wherein the second set of digits comprises digits that are unique to a cardholder;

create a hash representation of each given digit of the second set of digits based on providing the given digit and the first set of digits as input to a hash function; and create a respective secure representation of the respective credit card number based on the hash representations of each digit of the second set of digits; and based on more than a given threshold amount of transactions of the set of transactions having secure representations with more than a particular threshold number of matching hash representations, either:

block one or more transactions of the set of transactions; or flag at least one transaction of the set of transactions for review.

9. The system of claim 8, wherein creating hash representations of each given digit of the second set of digits further comprises providing a number that is selected based on a position of the given digit as input to a hash function.

10. The system of claim 8, wherein creating hash representations of each given digit of the second set of digits comprises selecting a subset of a set of characters generated by a hash function in response to receiving the given digit and the first set of digits as input, wherein the subset is used as the hash representation for the given digit.

11. The system of claim 8, wherein creating the secure representation of the credit card number comprises concatenating the hash representations of each given digit of the second set of digits based on an order associated with the second set of digits.

12. The system of claim 11, wherein creating the secure representation of the credit card number further comprises concatenating the hash representations of each given digit of the second set of digits to the first set of digits.

13. The system of claim 8, wherein the hash representations are created using a keyed hash function.

14. A non-transitory computer readable medium comprising instructions that, when executed by one or more processors of a computing system, cause the computing system to:

receive a set of electronic transactions, each electronic transaction of the set of electronic transactions comprising a respective credit card number;

for each respective credit card number:

select a first set of digits of the respective credit card number, wherein the first set of digits comprises one or more digits of a prefix of the respective credit card number;

select a second set of digits of the respective credit card number, wherein the second set of digits comprises digits that are unique to a cardholder;

create a hash representation of each given digit of the second set of digits based on providing the given digit and the first set of digits as input to a hash function; and create a respective secure representation of the respective credit card number based on the hash representations of each digit of the second set of digits; and based on more than a given threshold amount of transactions of the set of transactions having secure representations with more than a particular threshold number of matching hash representations, either:

block one or more transactions of the set of transactions; or flag at least one transaction of the set of transactions for review.

* * * * *